United States Patent
Larson et al.

(10) Patent No.: US 6,678,758 B2
(45) Date of Patent: Jan. 13, 2004

(54) DYNAMIC QUEUING FOR READ/WRITE REQUESTS

(75) Inventors: Jeffrey D. Larson, San Jose, CA (US); Hirohide Sugahara, Kawasaki (JP); Takashi Miyoshi, San Jose, CA (US); Takeshi Horie, Palo Alto, CA (US)

(73) Assignee: Fujitsu Limited, Kawasaki (JP)

( * ) Notice: Subject to any disclaimer, the term of this patent is extended or adjusted under 35 U.S.C. 154(b) by 362 days.

(21) Appl. No.: 09/778,649

(22) Filed: Feb. 5, 2001

(65) Prior Publication Data

US 2002/0108005 A1 Aug. 8, 2002

(51) Int. Cl.$^7$ .............................................. G06F 13/14
(52) U.S. Cl. ........................ 710/52; 711/150; 711/162
(58) Field of Search ........................... 710/52; 711/150, 711/162

(56) References Cited

U.S. PATENT DOCUMENTS

| | | | |
|---|---|---|---|
| 5,970,064 A | * | 10/1999 | Clark et al. ................. 370/351 |
| 6,260,125 B1 | * | 7/2001 | McDowell ................... 711/162 |
| 6,366,968 B1 | * | 4/2002 | Hunsaker ..................... 710/52 |
| 6,487,615 B1 | * | 11/2002 | Hunsaker ..................... 710/52 |
| 6,487,643 B1 | * | 11/2002 | Khare et al. ................. 711/150 |

OTHER PUBLICATIONS

U.S. patent application Ser. No. 09/953,153, Sugahara et al., filed Aug. 31, 2000.

* cited by examiner

*Primary Examiner*—Abdelmoniem Elamin
(74) *Attorney, Agent, or Firm*—Fenwick & West LLP (57) ABSTRACT

A PCI (peripheral component interconnect) network adaptor manages read/write requests through the establishment of dynamic queues. The PCI network adaptor establishes a unique queue for each destination node that enables the requests for each node to be processed separately. The PCI network adaptor determines whether a remote read/write request should be added to the linked list for the destination node of the request or whether the request should be rejected. If the number of pending requests for the destination node is below a predetermined threshold and the entire buffer is not full, then the request is added to the linked list for the destination node. Otherwise, the request is rejected. For write requests, if the request is added to the linked list for the destination node, then any pending read requests for that node are aborted.

15 Claims, 9 Drawing Sheets

DYNAMIC QUEUING FOR READ/WRITE REQUESTS

BACKGROUND OF THE INVENTION

1. Field of the Invention

This invention relates generally to computer networking, and more particularly, to the dynamic buffering of read and write requests over a computer network.

2. Description of the Related Art

In a computer network, remote read and write requests are sent via a network router from input/output (I/O) devices to processors at various nodes. A node may be configured as a host processor in which case the I/O devices will be connected to a central processing unit (CPU). A node may alternatively be unintelligent with the I/O devices simply connected to a bus. Each read or write request is addressed to a particular node and each node has a unique amount of traffic at any given time. As a result, some nodes will have a greater latency period than others. If requests for all of the nodes are using the same buffer, then monopolization of the buffer by a slow node can increase the latency time for requests to fast nodes because there will be no remaining buffer space for any requests other than those to the slow node.

Similarly, if the queuing system is a first-in-first-out (FIFO) system, then one request for a slow node could increase the latency time for all subsequent requests even if those requests are for substantially faster nodes.

One method for decreasing latency time is to use context switching. Context switching, however, requires the use of complex logic and large amounts of memory to store the contexts.

Thus, there is a need for a system of buffering read/write requests in a manner that minimizes the latency for each request. The buffering system allows for dynamic queuing such that requests for fast nodes are not affected by requests for slow nodes.

SUMMARY OF THE INVENTION

The present invention includes a PCI (peripheral component interconnect) network adaptor that manages read/write requests through the establishment of dynamic queues. The PCI network adaptor establishes a unique queue for each destination node that enables the requests for each node to be processed separately. This separate processing minimizes the latency time for requests by processing requests for fast destination nodes without delaying for slow destination nodes.

In one embodiment of the invention, a system includes a network router coupled to two or more PCI network adaptors. Each PCI network adaptor is coupled to a PCI bus and each PCI bus is coupled to one or more devices. The devices communicate remotely with each other using PCI protocols. The devices send read/write requests to various destination addresses via the PCI network adaptor. The PCI network adaptor determines whether each read/write request should be added to the linked list for the destination node of the request or whether the request should be rejected. The PCI network adaptor determines this based on various latency factors associated with the destination node. For instance, if the number of pending requests for the destination node is below a predetermined threshold and the entire buffer is not full, then the request is added to the linked list for the destination node. Otherwise, the request is rejected. For write requests, if the request is added to the linked list for the destination node, then any pending read requests for that node are aborted. Aborting read requests prevents the accessing of data before it has been updated by a pending write request.

DETAILED DESCRIPTION OF THE PREFERRED EMBODIMENTS

Figure 1:
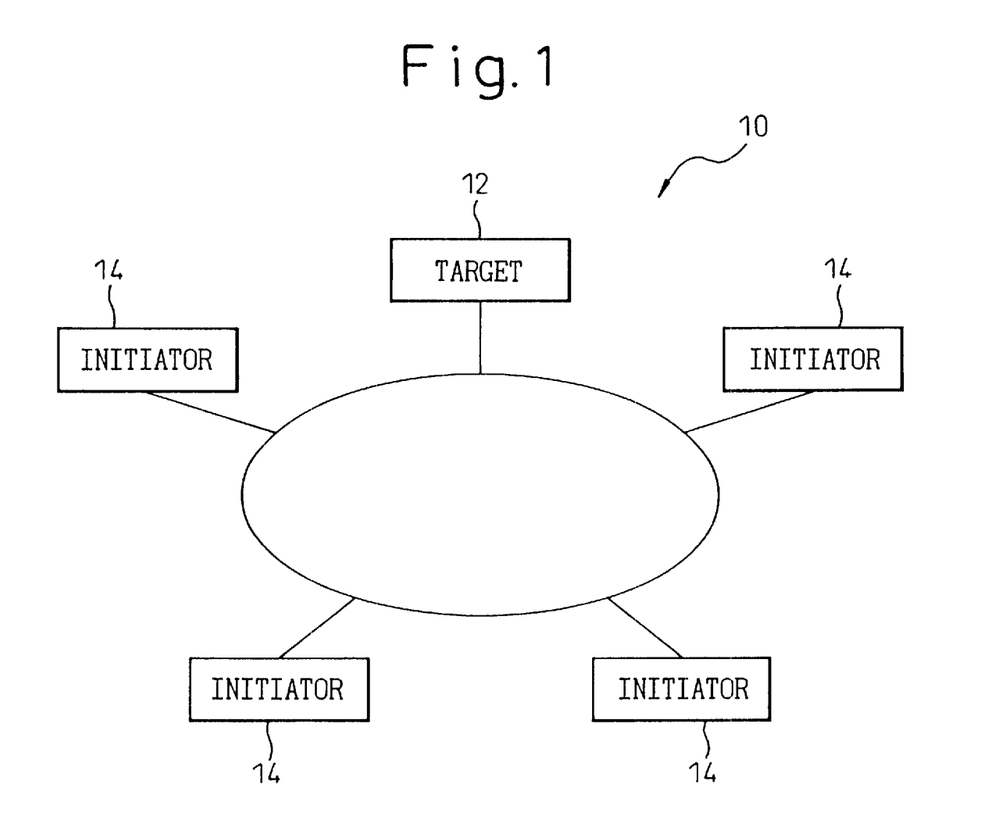
FIG. 1 is a block diagram of a preferred embodiment of a system including the present invention.

FIG. 1 is a block diagram of a preferred embodiment of a system 100 in accordance with the present invention. In this embodiment, system 100 includes a network router 103, PCI network adaptors 130A–C, PCI buses 120A–C, and devices 110A–H.

Each of devices 110 is coupled to a conventional PCI bus 120. Specifically, in this embodiment, devices A, C and D are connected to PCI bus 120A, devices B and E are connected to PCI bus 120B, and devices F, G and H are connected to PCI bus 120C. Although two or three devices 100 are shown on each PCI bus, one skilled in the art will recognize that either fewer or more devices 100 can be connected to any one bus depending on the desired application and system performance. Each PCI bus 120 is coupled to a PCI network adaptor 130 that provides a PCI interface for implementing conventional PCI protocols and ordering rules. The PCI network adaptors 130A through 130C are further coupled to a network router 103.

Each of devices 110A through 110H may be conventional PCI devices such as displays, disk drives, sound cards or SCSI adapters. Device 110 can also represent a conventional workstation or personal computer on a network, or it can represent an entire network. Alternatively, device 110 can represent a specialized node. For example, device 110 can be a data vault comprising a Direct Memory Access (DMA) device or disk controller card coupled to one or more storage devices. Device 110 can represent either an unintelligent node, such as an I/O device or an intelligent node that has a resident central processing unit (CPU) or microcontroller unit of some kind. In short, device 110 can be any one of a number of devices or node configurations.

The PCI bus may be a common expansion bus as used in the computer industry for connecting a processor with memory and/or peripheral devices. The PCI network adaptor 130 receives and processes remote read and write requests. The PCI network adaptor 130 is described in further detail below in the discussion of FIG. 2. The network router 103 may be any type of conventional router as used for data transfer over the Internet, an intranet, a local area network or any other networked environment. The various devices send remote read and/or write requests via the PCI bus 120 to the PCI network adaptor 130. The network adaptor 130 processes the requests using the algorithms discussed below. The requests are then sent via a network router 103 to their respective destination addresses. The processing of the requests ensures that the requests sent to available destination addresses are not delayed by those requests that are sent to slower or unavailable destination addresses.

Figure 2:
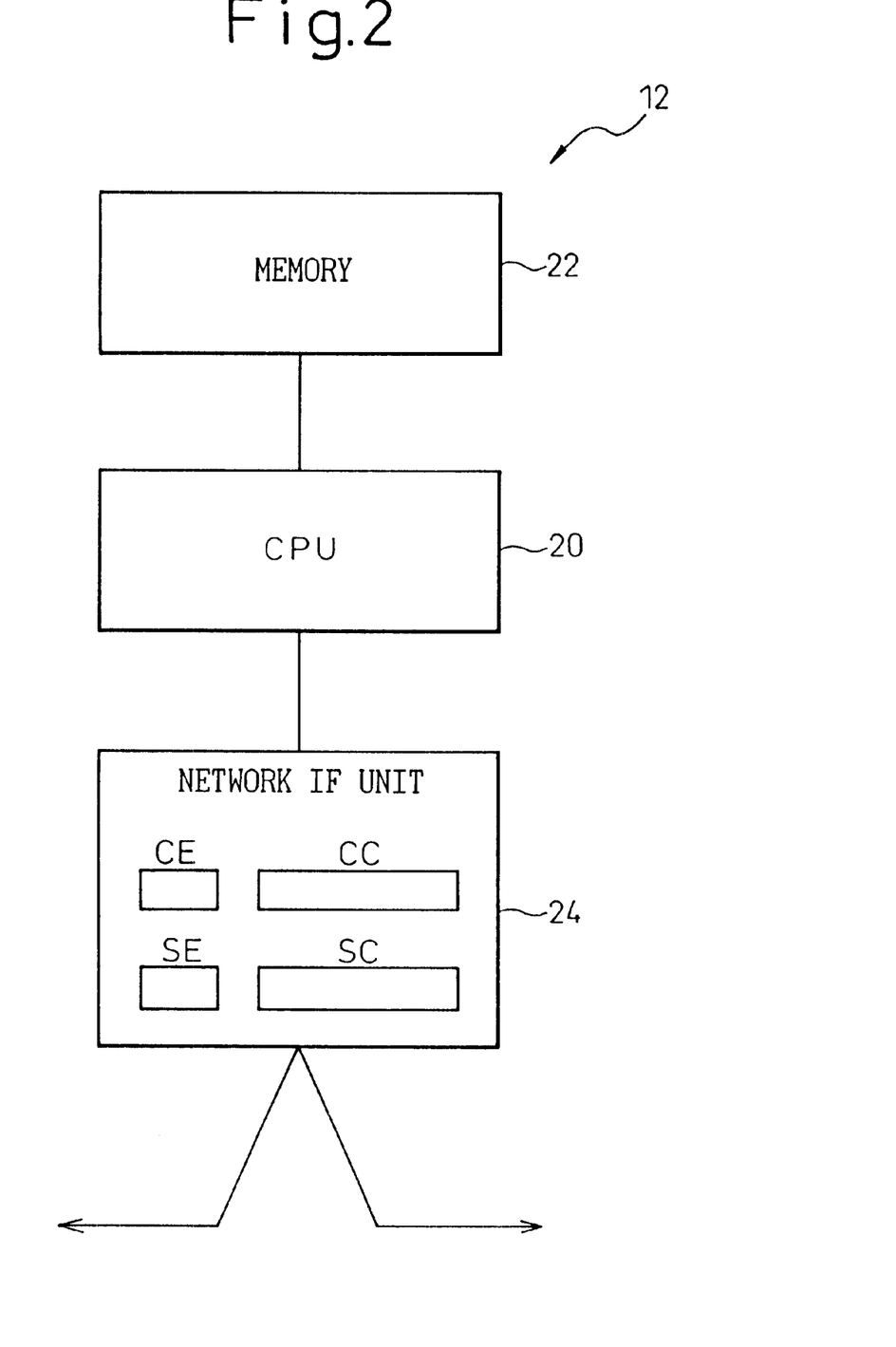
FIG. 2 is a block diagram of a preferred embodiment of the PCI network adaptor.

FIG. 2 is a block diagram of a preferred embodiment of a PCI network adaptor 130. The PCI network adaptor 130 includes a receiving module 202, an algorithm engine 204, a response module 206, a sending module 208, and a plurality of queues 210. The receiving module 202 is connected to the algorithm engine 204. The algorithm engine 204 is connected to both the response module 206 and the sending module 208. The sending module 208 includes the multiple queues 210. The receiving module 202 receives read and/or write requests from a requesting device 110 via the network router 103. The receiving module 202 transfers these requests to the algorithm engine 204. The algorithm engine 204 processes the requests using the algorithms discussed in FIGS. 3–6 below. The algorithm engine 204 generates a result based on these algorithms and sends that result to the response module 206. The response module 206 may send a response to the requesting device 110 based on the result generated by the algorithm engine 204. For instance, if the algorithm engine 204 decides to reject a write request, then the response module 206 would send a retry notice to the requesting device 110. The response module 206 may also send a "request accepted" message or an "abort read request" message. These responses are discussed in further detail below. If the algorithm engine 204 decides to accept the read or write request, then it transfers the request to the sending module 208. The sending module 208 adds the request to the linked list, or queue 210, associated with the receiving device 110. This process is discussed in greater detail in the description of FIG. 7 below. The sending module 208 then sends the request at the head of the queue 210 to the associated receiving device 110. Note that the elements in the PCI network adaptor 130 may be implemented as hardware or as software stored on a computer readable medium such as a disk and executed by a processor.

Figure 3A:
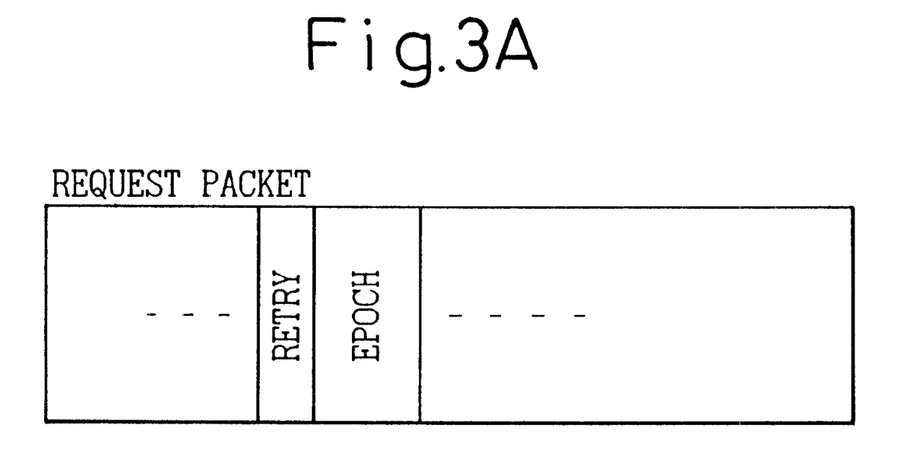
FIG. 3 is a flow diagram of a preferred embodiment of a process for receiving and processing write requests.
Figure 3B:
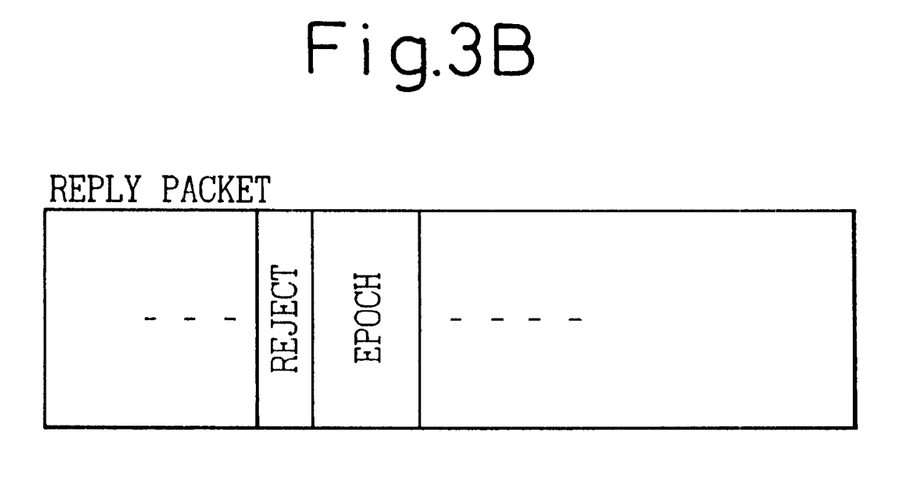

FIG. 3 is a flow diagram of a preferred embodiment of a process for receiving and processing remote write requests. In this embodiment, a write request includes a destination address and the data to be written to that address. Assume that device 110A has data to be written to device 110B. Before device 110A sends the data to device 110B, device 10A must ensure that device 110B is capable of accepting the data. Device 110A accomplishes this task by sending a write request, in this case, for device 110B. The PCI network adaptor 130A receives 302 this write request and determines whether the request satisfies 304 the criteria for new write requests. These criteria are based on the present capability of device 110B to receive the data and are discussed in greater detail in the description of FIG. 3, below. If the request does satisfy the criteria for new write requests, then the PCI network adaptor 130A that is connected to device 110A adds 306 the request to a linked list for its destination node, here the node containing device 110B.

If the request does not satisfy the criteria, then the PCI network adaptor 130A rejects 310 the request. The PCI protocol used by the PCI network adaptor 130 supports retry functions, thus, a rejected request will be associated with a retry command for that request. The PCI network adaptor 130 may store the data to be written and wait a predetermined period of time before assessing anew whether the request satisfies the criteria for the receiving node. After a certain number of retries, the PCI network adaptor 130 will abort the write request. In this case, the sending device will have to resend the request, thus causing the above process to repeat.

Once the write request satisfies the criteria for the destination node and the PCI network adaptor 130A adds 306 the write request to the queue for the destination node, then the PCI network adaptor 130A aborts 308 any conflicting read requests. For example, if device 110A has a write request pending in the queue for device 110B, then the PCI adaptor 130A would abort any read request pending for device 110B. Aborting conflicting read requests ensures that data in the pending write request is added to the requested file before it is read. Thus, the read request will access only the most current version of the requested files.

Figure 4A:
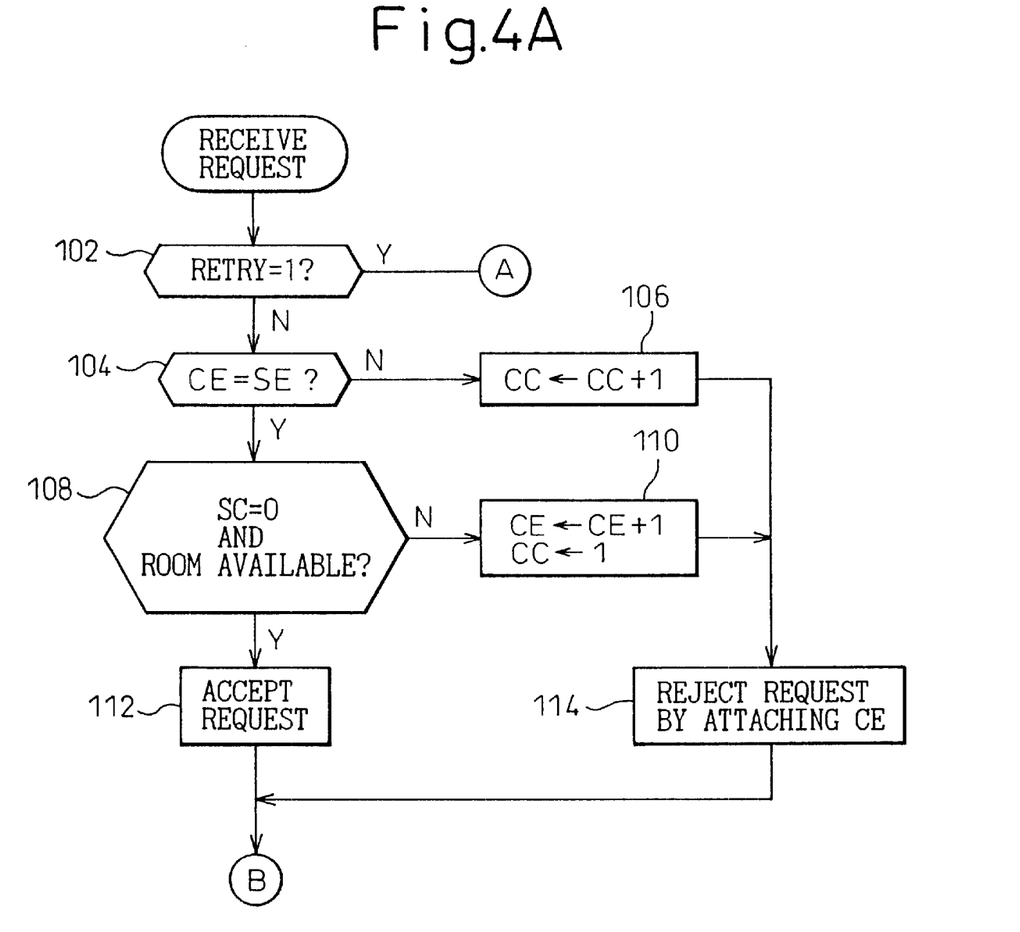
FIG. 4 is a flow diagram of a preferred embodiment of the process for determining whether the write request should be rejected or added to the buffer.
Figure 4B:
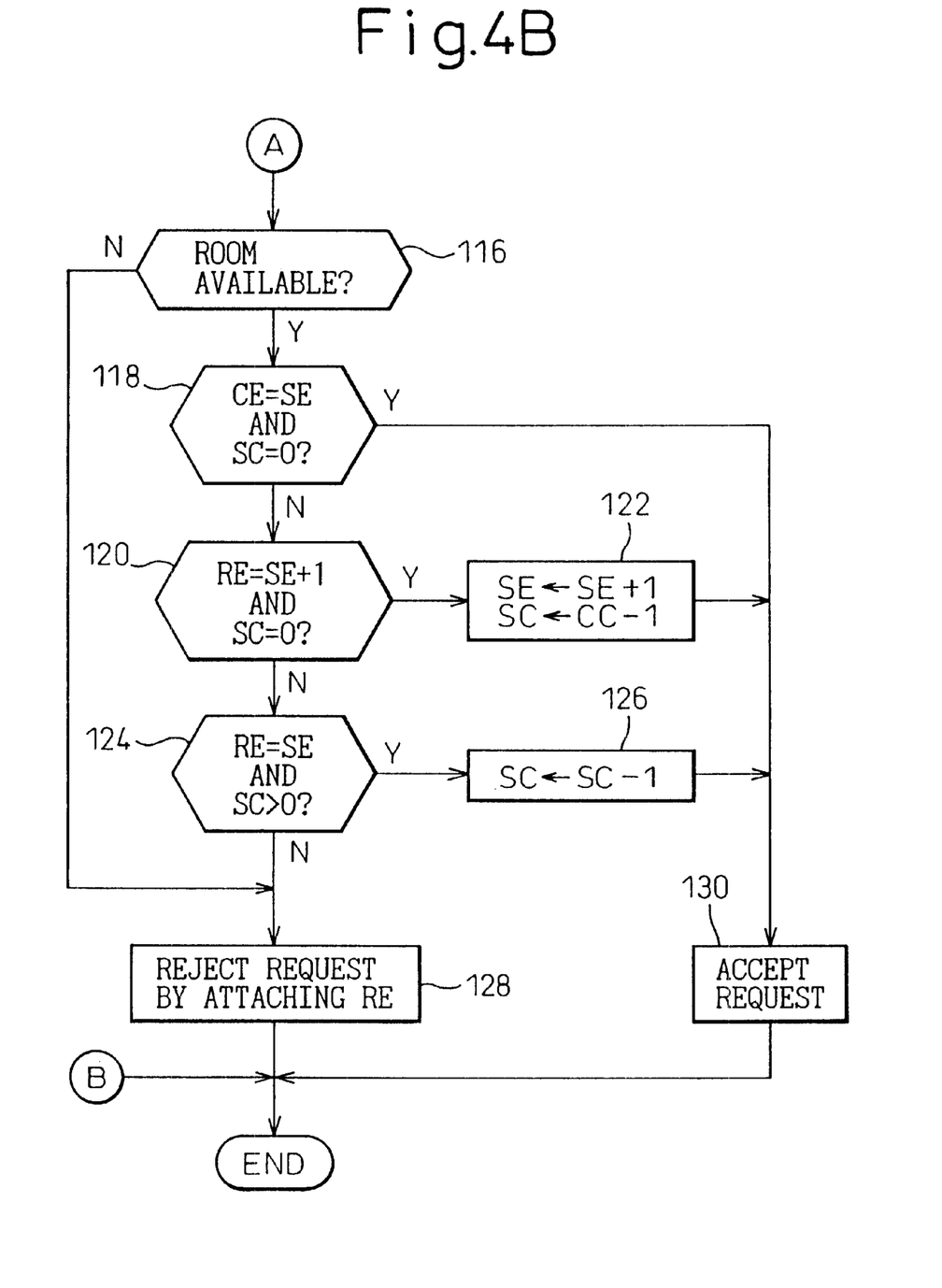

FIG. 4 is a flow diagram of a preferred embodiment for the process 304 for determining whether PCI network adaptor 130 should reject a write request or add it to the buffer. Similar to the example discussed above, assume that device 110A has data to be written to device 110B. The PCI network adaptor 130A receives a write request for this data from device 110A and determines whether the request satisfies 304 the criteria for new write requests. These criteria are based on the present capability of device 110B to receive the data. Once PCI network adaptor 130A receives the write request from device 110A, PCI network adaptor 130A does an associative look-up 402 of all requests for the destination node. Alternatively, the PCI network adaptor 130A can count the requests as they arrive and store the total number in memory. The number of requests for the destination node as determined by the associative look-up must be below a predetermined threshold in order to satisfy the criteria. By defining a maximum number of allowable requests for each node, the efficiency of the system can be maximized such that no particular node creates a backlog for the entire PCI bus. Thus, if the number of requests for the destination node is over the threshold, then the criteria is not satisfied 408 and the request is rejected. If the number of requests is not over the threshold, the PCI network adaptor 130A then checks 406 to see whether there is free space remaining in the buffer. If the buffer is full, then the criteria are not satisfied 408 and the write request is rejected even though the number of requests for the destination node is below the given threshold. If there is space remaining in the buffer, then the write request is accepted.

Figure 5:
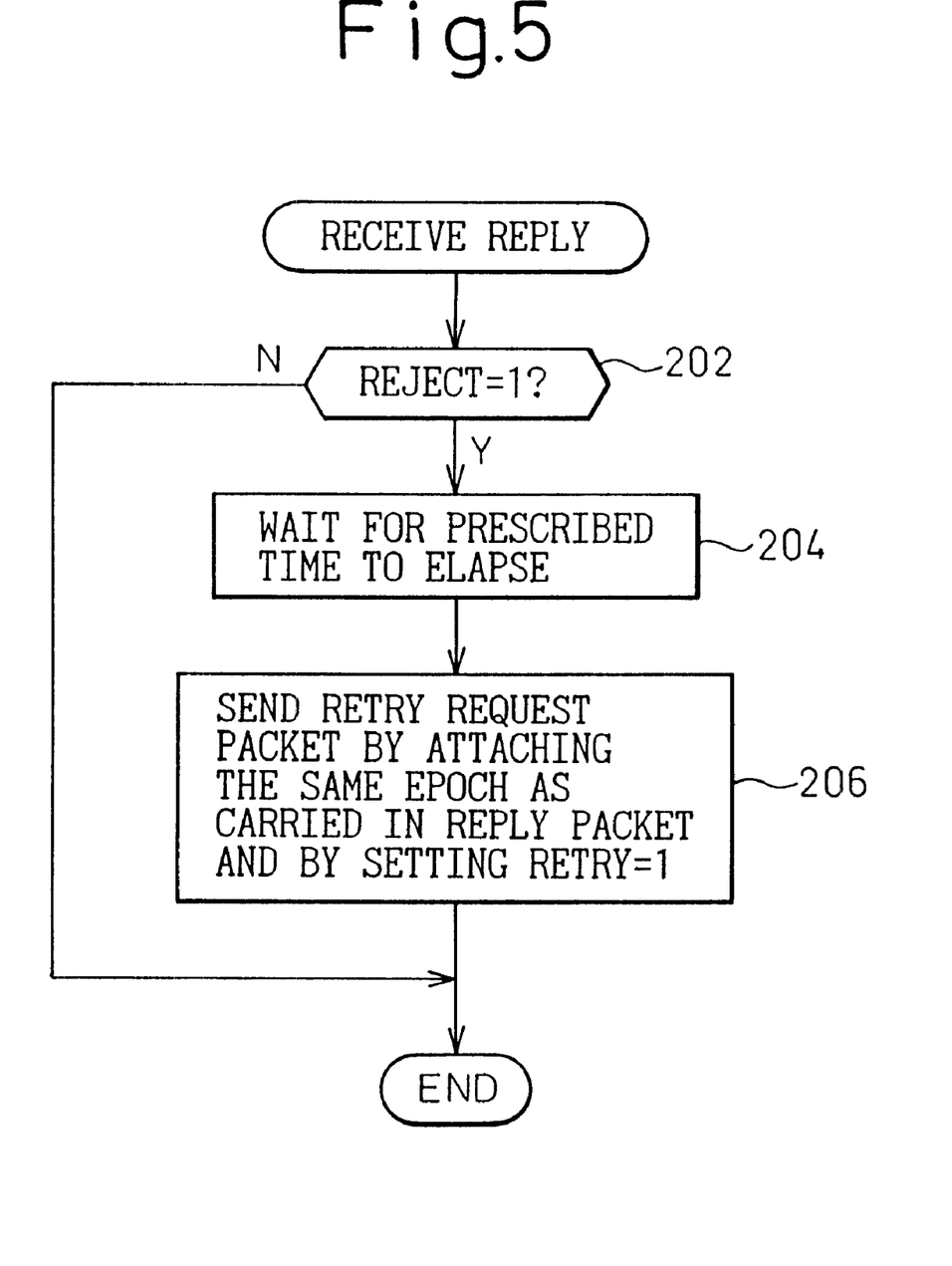
FIG. 5 is a flow diagram of a preferred embodiment of a process for receiving and administering read requests.

FIG. 5 is a flow diagram of a preferred embodiment of a process for receiving and administering read requests. Assume that device 110A wants to access or read data stored at device 110B. Device 110A would then send a read request to device 110B via the PCI network adaptor. In this embodiment, the PCI network adapter 130A receives 502 the read request from device 110A. If the read request satisfies 504 the required criteria then the PCI network adapter 130A adds 306 the request to the linked list for the destination device 110B. If the read request does not satisfy the criteria, then the PCI network adapter 130A rejects 506 the read request and sends a retry command back to device 110A. The required criteria for administering read requests are discussed in the following paragraph.

Figure 6:
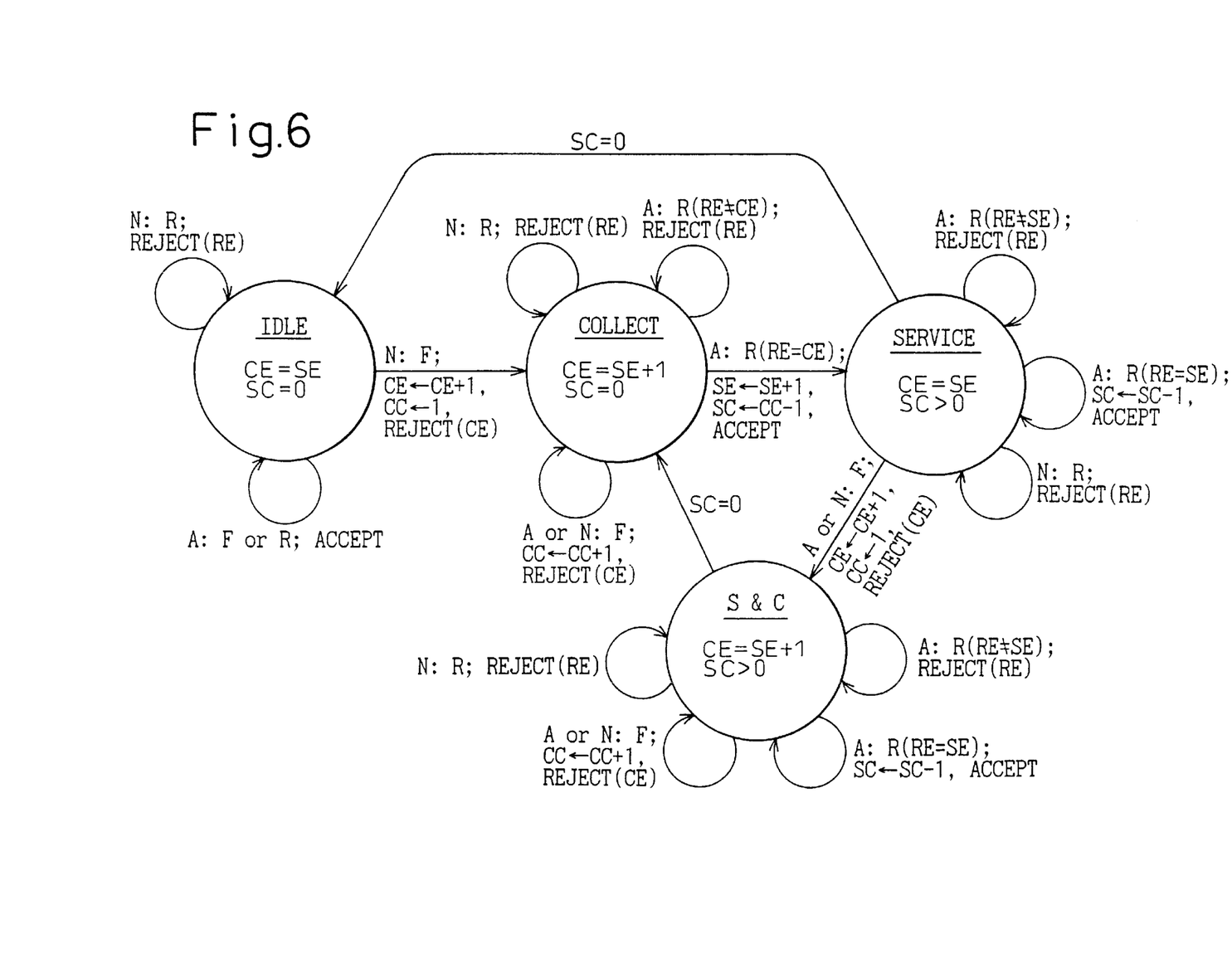
FIG. 6 is a flow diagram of a preferred embodiment of a process for determining whether the read request meets the required criteria.

FIG. 6 is a flow diagram of a preferred embodiment of a process for determining whether the read request meets the required criteria. If the read/write buffer is full 602, then the PCI network adapter 130 rejects the read request. Otherwise, the request is added to the queue 210 for the destination device 110. Since a buffer is required for each device 110 supported by the PCI bus 120, the overall length of the queue for the destination device 110 is not a factor in the decision to reject the request.

Figure 7:
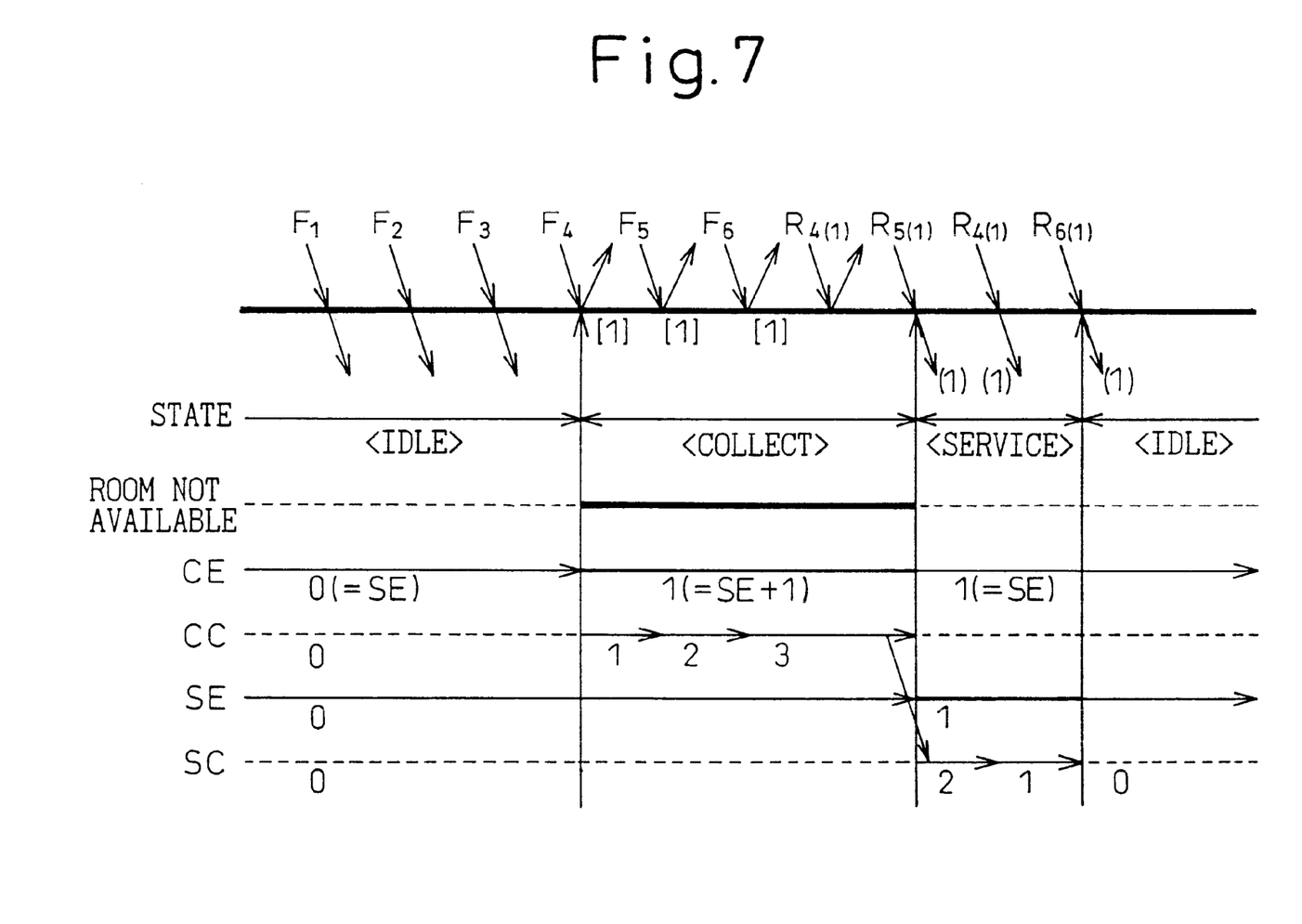
FIG. 7 is a flow diagram of a preferred embodiment of a process for adding a new request to the linked list for a destination node.
Figure 8:
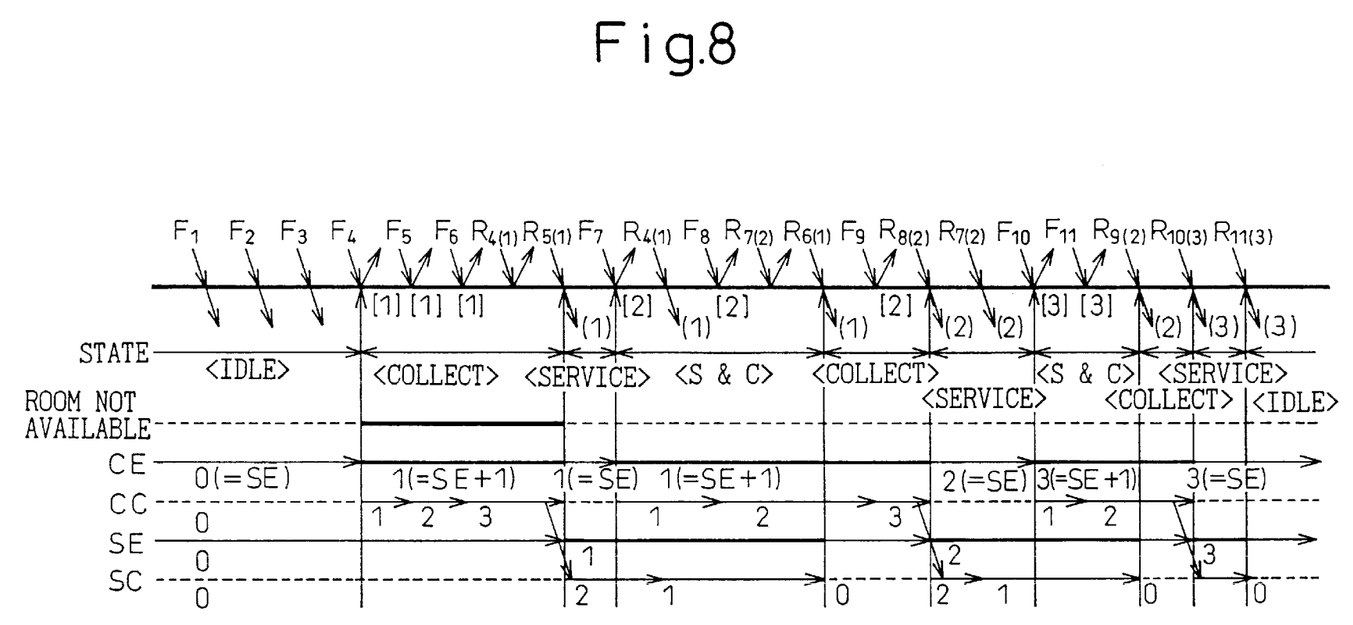

FIG. 7 is a flow diagram of a preferred embodiment of a process for adding a new request to the queue 210 for a given device 110A. The PCI network adaptor 130 accesses 702 the last packet, L, in the queue for device 110A. The PCI network adaptor 130A then sets 704 the "next packet" address in the header of packet L to the address for the new request. In this manner, the new request is added to the queue 210 of requests for device 110A. The new packet is then identified as the last packet in the list in order to enable future requests to be placed in the queue 210 in proper order.

The foregoing description is offered for illustrative purposes only. Numerous modifications and variations will be apparent to those skilled in the art based upon the foregoing discussion, while still falling within the spirit and scope of the invention claimed below and its equivalents.

We claim:

1. In a computer network system having a network adaptor, the network adaptor including a buffer with at least one linked list, a method for processing remote requests, comprising the steps of:

receiving a request from a first device for a second device;

adding the request to the linked list for the second device if the buffer is not full;

rejecting the request if the buffer is full;

sending the request to the second device from the linked list for the second device; and rejecting the request if the number of requests in the linked list for the second device is above a predetermined threshold.

2. The method of claim 1, wherein the network adaptor is a PCI network adaptor.

3. The method of claim 1 wherein the request is a write request.

4. The method of claim 1, further comprising maintaining a respective linked list for each device of a plurality of devices in the computer network.

5. The method of claim 3, further comprising aborting previously pending conflicting read requests.

6. An apparatus for receiving and processing remote read and write requests from a first device to a second device, the apparatus comprising:

a receiving module for receiving the request from the first device;

a buffer including at least one linked list, the buffer receiving the request;

an algorithm engine coupled to the receiving module and the buffer, the algorithm engine adding the request to the linked list for the second device if the buffer is not full, rejecting the request if the buffer is full, and rejecting the request if the number of requests in the linked list for the second device is above a predetermined threshold; and a sending module for sending the request to the second device from the linked list for the second device.

7. The apparatus of claim 6 wherein the apparatus is a PCI network adaptor.

8. The apparatus of claim 6, wherein the request is a write request.

9. The apparatus of claim 6 wherein the algorithm engine maintains a respective linked list for each device of a plurality of devices in the computer network.

10. The method of claim 8, further comprising a response module coupled to the algorithm engine for aborting conflicting previously pending read requests in response to a result from the algorithm engine.

11. In a computer network system having a network adaptor, the network adaptor including a buffer with at least one linked list, a computer program product for processing remote requests, comprising:

program code for receiving a request from a first device for a second device;

program code for adding the request to the linked list for the second device if the buffer is not full;

program code for rejecting the request if the buffer is full;

program code for sending the request to the second device from the linked list for the second device; and program code for rejecting the request if the number of requests in the linked list for the second device is above a predetermined threshold.

12. The computer program product of claim 11 wherein the network adaptor is a PCI network adaptor.

13. The computer program product of claim 11, wherein the request is a write request.

14. The computer program product of claim 13, further comprising program code for maintaining a respective linked list for each device of a plurality of devices in the computer network.

15. The computer program product of claim 13, further comprising program code for aborting previously pending conflicting read requests.

* * * * *

UNITED STATES PATENT AND TRADEMARK OFFICE
CERTIFICATE OF CORRECTION

PATENT NO. : 6,678,758 B2
DATED : January 13, 2004
INVENTOR(S) : Jeffrey D. Larson et al.

It is certified that error appears in the above-identified patent and that said Letters Patent is hereby corrected as shown below:

Title page,
Item [56], References Cited, U.S. PATENT DOCUMENTS, add the following reference:
-- 09/653,154    08/2000        Sugahara et al. --

Signed and Sealed this

Thirtieth Day of March, 2004

JON W. DUDAS
*Acting Director of the United States Patent and Trademark Office*